United States Patent Office 3,531,482
Patented Sept. 29, 1970

3,531,482
PYRAZOLO[1,5-c]QUINAZOLINES
Hans Ott, Convent Station, N.J., assignor to Sandoz-Wander, Inc., Hanover, N.J.
No Drawing. Filed Oct. 13, 1966, Ser. No. 586,362
Int. Cl. C07d 87/40
U.S. Cl. 260—247.5    3 Claims

ABSTRACT OF THE DISCLOSURE

The invention discloses 5-substituted pyrazolo[1,5-c]quinazolines useful as anti-inflammatory agents. The compounds may be prepared by reaction of the corresponding 5-methylthio derivatives with an appropriate amine, e.g. ammonia, morpholine and the like. The methylthio derivative may be prepared from the corresponding thione by reaction thereof with methyl iodide.

---

This invention relates to heterocyclic compounds. In particular, the invention pertains to pyrazolo[1,5-c]quinazolines and a process for preparing the same. The invention also relates to intermediates which are useful in preparing the above compounds and a process for preparing said intermediates.

The pyrazolo[1,5-c]quinazolines of the present invention may be represented structurally as follows:

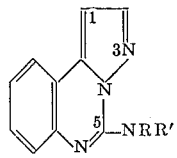

I wherein —NRR' represents amino (NH₂); morpholino; piperidino; or 4-loweralkylpiperazino, e.g., 4-methylpiperazino and 4-ethylpiperazino.

The compounds of Formula I are prepared by reacting 5-(o-aminophenyl)pyrazole with carbon disulfide to form the compound pyrazolo[1,5-c]quinazolin-5(6H)-thione, treating the latter with methyl iodide to form the compound 5-methylthio-pyrazolo[1,5-c]quinazoline and then contacting the latter with ammonia or an appropriate amine.

This process may be illustrated structurally as follows:

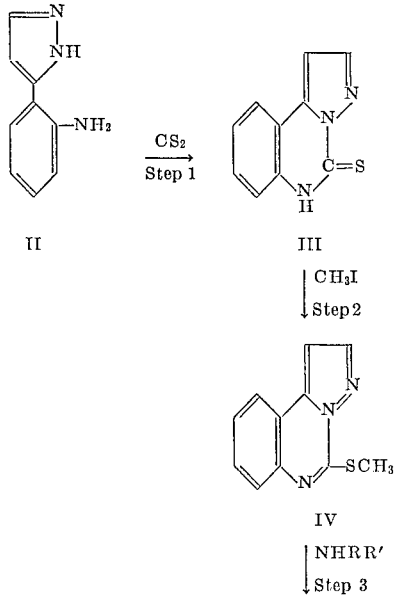

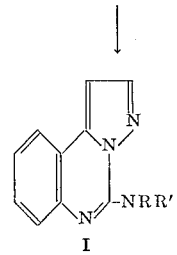

I

The reaction of the 5-(o-aminophenyl)pyrazole (Step 1) is conveniently carried out in a suitable inert organic solvent, e.g., pyridine, and at an elevated temperature, preferably reflux temperature. Conversion of the thione (III) to the methylthio derivative (IV) (Step 2) is readily effected in an inert organic solvent, e.g., dimethylformamide and dimethylsulfoxide, and at room temperature (20° C.). In the last step of the reaction (Step 3) the methylthio derivative (IV) is reacted with ammonium acetate or an appropriate amine or salt thereof in an inert organic solvent (or employing an excess of the amine base in lieu thereof) and at elevated temperatures up to reflux temperature.

The compounds of Formula I are useful because they possess pharmacological activity in animals. In particular the compounds are useful as anti-inflammatory agents. For such usage the compounds may be admixed with conventional pharmaceutical carriers and other adjuvants, if necessary, and administered orally in such forms as tablets, capsules, elixirs, suspensions, and the like or parenterally in the form of an injectable solution or suspension. The compounds may be administered in their free base form or in the form of a pharmaceutically-acceptable acid addition salt thereof. Such salts possess the same order of activity as the free base, are readily prepared by reacting the base with an appropriate acid in conventional manner and accordingly are included within the scope of this invention. Representative of such salts are the mineral acid salts, such as the hydrochloride, hydrobromide, phosphate, sulfate and the like, and the organic acid salts, such as the acetate, benzoate, methanesulfonate, benzenesulfonate, toluenesulfonate and the like.

The dosage employed will, of course, vary depending upon the compound used and mode of administration. However, in general, satisfactory results are obtained when administered to laboratory animals at a daily dosage of from about 100 milligrams per kilogram of body weight to about 200 milligrams per kilogram of body weight. The preferred daily dosage is from about 1 gram to about 3 grams, preferably given in divided doses of from about 250 milligrams to about 1000 milligrams throughout the day. A representative formulation suitable for oral administration is a tablet (prepared by standard tabletting techniques) and containing the following ingredients:

| | Parts by weight |
|---|---|
| 5-morpholino-pyrazolo[1,5-c]quinazoline | 50 |
| Tragacanth | 2 |
| Lactose | 39.5 |
| Corn starch | 5 |
| Talcum | 3 |
| Magnesium stearate | 0.5 |

The following examples show representative compounds encompassed within the scope of this invention and the manner in which such compounds are prepared. However, it is to be understood that the examples are for purposes of illustration only and are not intended as in any way limiting the scope of the invention which is defined in the appended claims.

EXAMPLE 1

5-morpholino-pyrazolo[1,5-c]quinazoline

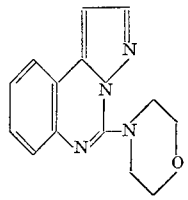

Step A.—Preparation of pyrazolo[1,5-c]quinazolin-5(6H)-thione

A mixture of 50 g. of 5-(o-aminophenyl)pyrazole in 400 ml. of pyridine, 250 ml. of carbon disulfide and 20 ml. of water is refluxed for 40 hours. The mixture is then evaporated in vacuo to remove the volatile constituents and the residue crystallized from a mixture of methanol-benzene (1:1) to obtain pyrazolo[1,5-c]quinazolin-5(6H)-thione, M.P. 235–238° C.

Step B.—Preparation of 5-methylthio-pyrazolo[1,5-c]quinazoline

To a solution of 10 g. of pyrazolo[1,5-c]quinazolin-5(6H)-thione in 100 ml. of dimethylsulfoxide is added 10 g. of methyl iodide. The resulting mixture is stirred at ambient temperature for 2 hours and the excess methyl iodide then removed in vacuo at room temperature. To the resultant is slowly added a solution of 2.2 g. of sodium hydroxide in 10 ml. of water, then more water is added and the resulting precipitate recovered by filtration to obtain 5 - methylthio - pyrazolo[1,5-c]quinazoline, M.P. 68–70° C.

Step C.—Preparation of 5-morpholino-pyrazolo[1,5-c]quinazoline

A mixture of 7.0 g. of 5-methylthio-pyrazolo[1,5-c]quinazoline and 12 ml. of morpholine is heated at 150° C. for 40 hours. The excess morpholine is then removed under high vacuum and the residue crystallized from methylene chloride-diethyl ether to obtain 5-morpholino-pyrazolo[1,5-c]quinazoline, M.P. 102–103° C.

EXAMPLE 2

5-amino-pyrazolo[1,5-c]quinazoline

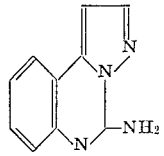

A mixture of 1 g. of 5 - methylthio-pyrazolo[1,5-c]quinazoline and 2.5 g. of ammonium acetate is heated at 150° C. for 40 hours. The thus-obtained residue is cooled and then distributed between 2 N sodium hydroxide and methylene chloride. The organic phase is separated, dried over anhydrous sodium sulfate, filtered and the filtrate concentrated to a volume of 5 to 10 ml. The crystalline product thus obtained is recovered by filtration to obtain 5-amino-pyrazolo[1,5-c]quinazoline, M.P. 202–205° C.

EXAMPLE 3

Following the procedure of Step C of Example 1 and employing an equivalent amount of the amines enumerated below in place of the morpholine used therein, there are obtained the products set forth below.

| Amine: | Product |
|---|---|
| (1) Piperidine | 5-piperidino - pyrazolo[1,5-c]quinazoline. |
| (2) N-methylpiperazine | 5-(4 - methylpiperazino) - pyrazolo[1,5-c]quinazoline. |
| (3) N-ethylpiperazine | 5 - (4 - ethylpiperazino( - pyrazolo[1,5-c]quinazoline. |

What is claimed is:
1. A compound selected from the group consisting of quinazolines of the formula

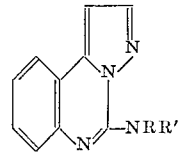

and the non-toxic acid addition salts thereof, wherein —NRR' represents amino, morpholino, piperidino or 4-alkylpiperazino in which the alkyl is of 1 or 2 carbon atoms.

2. The compound of claim 1 which is 5-amino-pyrazolo[1,5-c]quinazoline.

3. The compound of claim 1 which is 5-morpholino-pyrazolo[1,5-c]quinazoline.

References Cited

UNITED STATES PATENTS 3,313,815   4/1967   Wolfe et al. _____ 260—256.4

JOSE TOVAR, Primary Examiner

U.S. Cl. X.R.

260—256.4, 256.5; 424—248, 251